United States Patent [19]

Ozero et al.

[11] Patent Number: 4,595,404
[45] Date of Patent: Jun. 17, 1986

[54] $CO_2$ METHANE SEPARATION BY LOW TEMPERATURE DISTILLATION

[75] Inventors: Brain J. Ozero, 225 E. 36 St., Apt. 19A, New York, N.Y. 10016; Michael P. Czaikowski, Stafford; H. Edward Gimpel, Houston, both of Tex.

[73] Assignee: Brian J. Ozero, New York, N.Y.

[21] Appl. No.: 691,298

[22] Filed: Jan. 14, 1985

[51] Int. Cl.⁴ ................................................ F25J 3/02
[52] U.S. Cl. .......................................... 62/18; 62/24; 62/29; 62/31; 62/34
[58] Field of Search .................. 62/23, 24, 31, 32, 34, 62/25–30, 18

[56] References Cited

U.S. PATENT DOCUMENTS 2,551,399  5/1951  Silverberg ............................. 62/23
3,983,711  10/1976  Solomon ................................. 62/28

Primary Examiner—Frank Sever
Attorney, Agent, or Firm—Daniel R. Zirker

[57] ABSTRACT

A process for the regeneration of a $CO_2$ gaseous stream such as are utilized in $CO_2$ miscible flooding for petroleum recovery, is disclosed. The process utilizes an economic, low energy intensive cycle to regenerate a wide range of $CO_2$ containing compositions, which are typically recycled for further use.

18 Claims, 2 Drawing Figures

$CO_2$ METHANE SEPARATION BY LOW TEMPERATURE DISTILLATION

BACKGROUND OF THE INVENTION

Many hydrocarbon gas streams in addition to containing a substantial methane component also possess significant amounts of heavier hydrocarbons such as ethane, propane, butane, etc., as well as substantial amounts of acid gases such as COS, $H_2S$ and, particularly, $CO_2$. Frequently it is necessary to separate the acid gas, e.g., $CO_2$ component, from the hydrocarbon component as well as separate the heavier hydrocarbon fractions from the methane. For example, in order for natural gas to be commercially acceptable, it must first meet stringent specifications with regard to heating value, hydrogen sulfide and carbon dioxide content.

There are currently a number of established technologies for the removal or partial separation of acid gases from hydrocarbon streams. Thus, it is known to use physical solvents which are selective toward the acid gas component and chemical solvents which will react with such components. Suitable examples of physical solvents include propylene carbonate, dimethylether and polyethylene glycol. Examples of suitable chemical solvents are aqueous solutions of potassium carbonate as well as a variety of amines, such as monoethanolamine, diethanolamine and the like.

Carbon dioxide flooding is a process which can be particularly useful in enhanced oil recovery processes. Carbon dioxide flooding can proceed through a variety of mechanisms, including:

(1) immiscible $CO_2$ drive;
(2) miscible $CO_2$ drive;
(3) hydrocarbon-$CO_2$ miscible drive;
(4) solution gas drive;
(5) hydrocarbon vaporization; and
(6) multiple-contact dynamic miscible drive. In the L. M. Home et al, December 1974 publication in the Journal of Petroleum Technology, the $CO_2$ properties believed to be important in causing oil displacement were stated to be the following:

(1) $CO_2$ reduces oil viscosity;
(2) $CO_2$ increases oil density;
(3) $CO_2$ promotes swelling of oil;
(4) $CO_2$ is highly soluble in water;
(5) $CO_2$ in water has an acidic effect on limestone and carbonate rock and thus dissolves the rock;
(6) $CO_2$ vaporizes and extracts portions of crude oil; and
(7) $CO_2$ is transported chromatographically through porous rock.

Miscible flooding with $CO_2$ has recently become increasingly popular, due both to its ability to recover valuable hydrocarbons from naturally occurring gas formations which were previously uneconomical to recover and also to the increased suitability for the recovery of petroleum deposits. Thus, the use of carbon dioxide for miscible flooding is gaining momentum; consequently, growing amounts of associated gas utilized in wells stimulated by this method must be processed, both in order to recover the extracted hydrocarbon content and also to efficiently recover and recycle the carbon dioxide for reinjection into the well. However, the effectiveness of $CO_2$ is greatly reduced when contaminated with impurities such as methane and nitrogen. Accordingly, an economical method for producing a rich $CO_2$ stream substantially either reduced or free from these impurities has been a goal of the art.

A number of distillation techniques can be useful for the separation of $CO_2$-hydrocarbon streams, particularly at higher $CO_2$ levels. One such attempt, the so-called Ryan-Holmes process, involves an initial separation of the methane component present from the $CO_2$ and the heavier hydrocarbons. Since $CO_2$ freezes at the temperatures usually encountered in a demethanizer, an alkane is fed in at the top of the column, thereby preventing freezing of the $CO_2$. Subsequent distillation can separate $CO_2$ from the hydrocarbon stream, and the various hydrocarbons themselves, but this leads to an expensive, involved process.

A combination distillation-membrane process has been set forth in U.S. Pat. No. 4,374,657 to Fluor, Inc.

In U.S. Pat. No. 4,417,449 a process for the separation of $CO_2$ and sulfide gases from oil shale retorting, coal gasification, oxygen fireflooding, and $CO_2$ miscible flood enhanced oil recovery of the off gases for various recycle processes, such as to a petroleum reservoir, is reported. The process separates the off gases into an essentially sulfur-free light BTU fuel gas, a heavy hydrocarbon stream, and a $CO_2$ acid gas stream, with the $CO_2$ stream being expanded in an auto-refrigeration step to provide the necessary process refrigeration.

SUMMARY OF THE INVENTION

Accordingly, the invention comprises a process for the regeneration of a carbon dioxide gaseous stream further containing a significant acid gas component, such as $H_2S$ and COS, as well as a variety of carbonaceous, e.g., petroleum-based compounds. The process comprises: compressing and cooling the $CO_2$ feed stream, typically containing $CO_2$, acid gases, light fuel gases, and heavy hydrocarbons, e.g., petroleum products from a subsurface well, to a suitable elevated temperature e.g., 70° to 90° F., and superatmospheric, e.g., 450 to 550 psig, pressure; substantially removing any acid gases, i.e., sour gases, present, e.g., by liquid phase oxidation, from the $CO_2$ feed stream; preferably further cooling the feed stream by contacting with a suitable cool product stream, e.g., a pressurized, liquid $CO_2$ stream in a suitable heat exchange zone; drying the $CO_2$ feed stream, e.g., by conventional low temperature procedures to about 0–2 ppm water; separating the $CO_2$ feed stream in a single distillation zone which is primarily externally refrigerated into a (1) light fuel gas stream, (2) a liquid, substantially $CO_2$-containing stream, and (3) a heavy hydrocarbon stream; the external refrigeration, preferably comprising about 60–90%, most preferably about 75%, occurring by the utilization of a distillation intercooler unit positioned above the $CO_2$ containing sidedraw stream withdrawal; cooling the light fuel gas stream e.g., preparing it for use as a suitable product, e.g., by contacting in a suitably refrigerated overhead condenser unit and removing a desired light fuel gas fraction; pressurizing and transporting the substantially $CO_2$-containing liquid stream, e.g., a sidedraw stream, preferably substantially stripped of non $CO_2$ component in an adjacent stripping zone, into a suitable heat exchange zone, i.e., for heating by contacting the entering $CO_2$ feed stream before exiting as product, e.g., recycling the stream to underground petroleum formations; separating the heavy hydrocarbon stream into a lighter hydrocarbon gas stream which, preferably, is combined with the light fuel gas product stream, and a heavier hydrocarbon stream, e.g., by a suitable distillation stage.

FIG. 1 discloses a simplified outline of the preferred embodiment of the invention.

FIG. 2 discloses a range of calculated $CO_2$ product purity streams depending upon whether or not a side stripping unit is utilized in the primary distillation zone.

DETAILED DESCRIPTION OF THE INVENTION

One major utilization of carbon dioxide miscible flooding is the recovery of liquid hydrocarbons such as petroleum in underground formations which are not naturally producing due to high viscosities, surface tensions, and/or a lack of adequate pressure present in the petroleum formations. Carbon dioxide miscible flooding enhanced oil recovery involves no deliberate combustion, but rather a high pressurization of the subsurface formation with $CO_2$ so as to dissolve the oil in the $CO_2$ and withdraw a single phase, $CO_2$-petroleum containing fluid toward a surface well.

Figure 1:
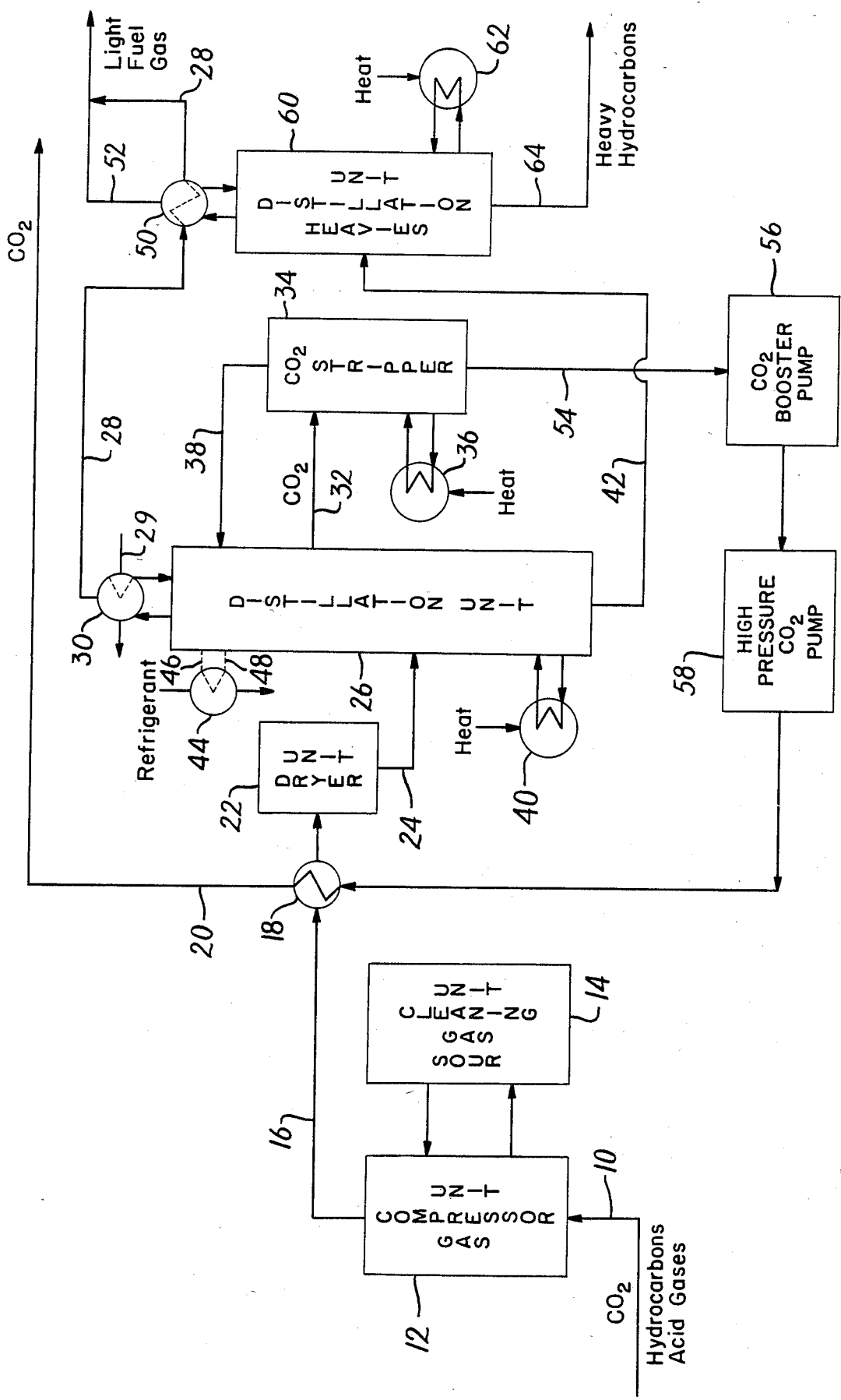
Figure 2:
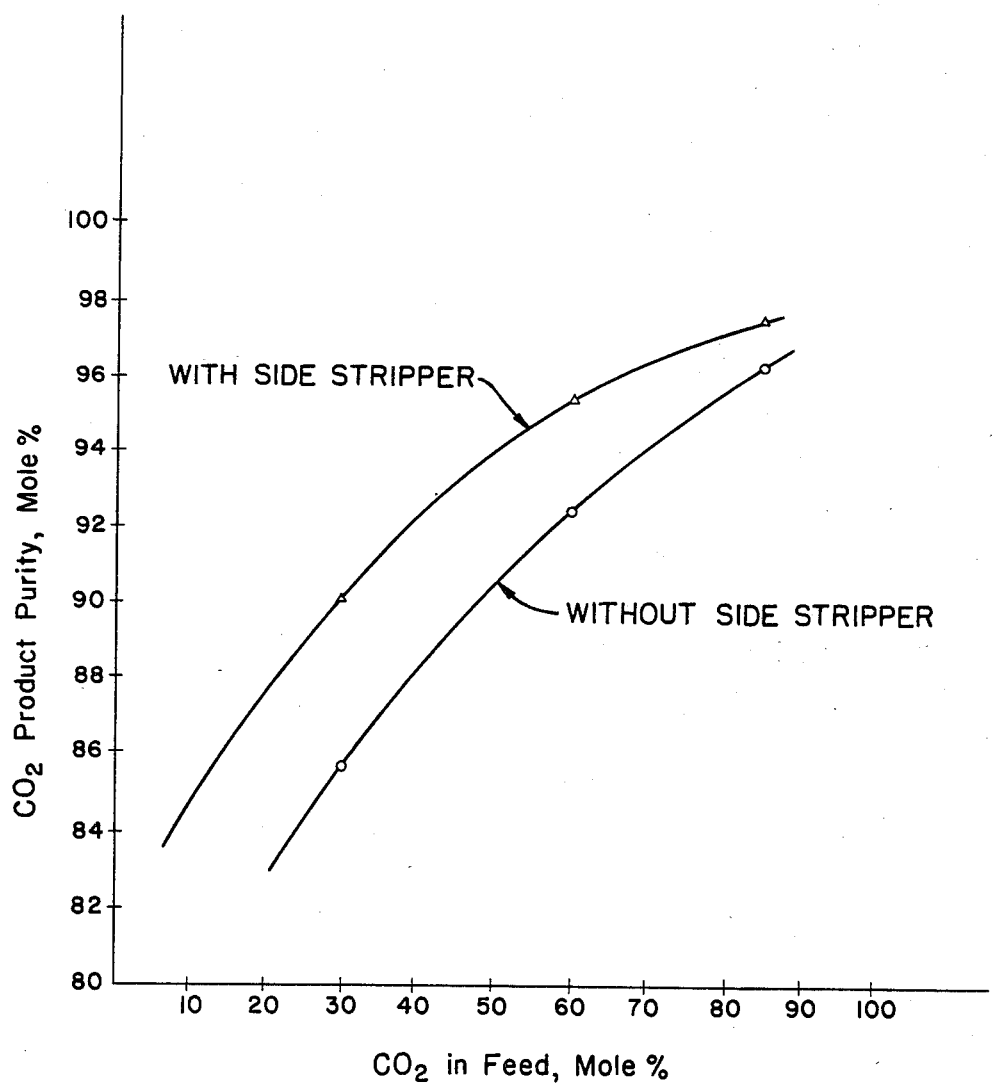

In FIG. 1 a simplified outline of the preferred embodiment of the regeneration of the carbon dioxide utilized in a miscible flooding process or the like has been set forth. A feed gas stream 10, typically passing from a crude separation unit or the like, comprises a $CO_2$-hydrocarbon stream having a $CO_2$ content ranging from about 10 to 95 mole %, preferably, from about 60 to 90 mole %, at about 100° F. and 5-10 psig. The stream is compressed in feed gas compressor unit 12, preferably to an intermediate pressure level, e.g., 30 to 60 psig, with the hydrocarbon condensate being recovered in the decanters following the aftercoolers, flashed and returned to the crude oil separator for recovery (not shown). If, as usually is the case, the feed stream contains $H_2S$, COS, mercapatans, or the like, some or all of these components can be removed in gas cleaning unit 14 by suitable procedures, e.g., direct liquid phase oxidation of $H_2S$ to sulfur, and the like. After one or, preferably two additional compression steps and suitable amounts of aftercooling, the feed stream 16 preferably next passes into a feed-product heat interchanger 18, where the feed gas is cooled to 80° F., preferably by contacting with a cooled, substantially liquid $CO_2$ product stream 20 maintained at a temperature of about 50 to 60° F. Hydrocarbon and water condensates are again separated from the feed stream following cooling, with the hydrocarbons being decanted, flashed, and passed back to the crude oil separator. The feed gas stream is then dehydrated to about 0-2 ppm $H_2O$, preferably less than about 1 ppm $H_2O$, in dryer unit 22, which is typically a solid desiccant dryer, or the like. After dehydration, the feed gas stream is then passed through line 24 to the primary distillation unit 26, which is a low-temperature multi-product column in which a cold fuel gas overhead stream 28, typically comprised of about 64 mole % $CH_4$, 18-22% $CO_2$, 5% propane, 6% butane, and the remaining various other hydrocarbons and inerts, is taken off and passes through condensor 30 at a pressure of about 400 to 600 psig and −60° to −70° F.; a liquid product stream 32, typically comprised of at least 90 mole % $CO_2$ with minor fractions of methane, ethane and the like, at a pressure of about 400-600 psig and 20°-30° F., passes from the column as a sidedraw stream, in a manner similar to that described in U.S. Pat. No. 4,417,449. In the most preferred embodiment, a substantial improvement in $CO_2$ purity is obtained by further stripping the exiting sidedraw liquid product stream 32, as is further indicated in FIG. 2 and accompanying Table I. Surprisingly, a 95 mole % $CO_2$ product stream can be obtained using the side stripper unit 34 with feeds as low as 57 mole % CO, whereas only about 75% is obtainable without using the side stripper unit. Sidedraw stream 32 is so processed by entering $CO_2$ stripping unit 34, typically a small, suitably packed column known to those in the art, whereupon the incoming liquid stream 32 is stripped by the vapors generated in the stripper reboiler unit 36, with the exiting vapors from the stripper in line 38 re-entering the primary distillation unit 26 at a suitable tray positioned above the sidedraw stream 32 location. The vapor for primary distillation unit 26 is provided by reboiler unit 40.

TABLE I

| Example | Feed Makeup: (Mole %)* | | | | |
|---|---|---|---|---|---|
| | $CO_2$ | $C_2H_6$ | $C_3H_8$ | $CH_4$ | $C_{4s}$ |
| 1 | 30% | 7.0% | 6.8% | 45.7% | 9.5% |
| 2 | 60% | 4.0% | 3.9% | 26.1% | 5.4% |
| 3 | 85% | 1.5% | 1.5% | 9.8% | 2.0% |

*The balance is comprised of $N_2$, $O_2$.

A smaller, heavier hydrocarbon bottoms stream 42, typically comprising about 42 mole % hexane, 22% isopentane, 27% pentane, 8% butane, along with various minor products is removed by pressure let-down from the bottom of distillation column 26. In sharp contrast to the expensive auto-refrigeration system required in the aforementioned U.S. Pat. No. 4,417,449, since in this system much of the condenser duty is required for the liquefaction of the $CO_2$ component, a surprising improvement has been realized through the utilization of a distillation intercooler unit 44. The unit, when appropriately positioned near the top of the column above the $CO_2$ sidedraw tray, as would be apparent to one skilled in the art, substantially reduces the use of the expensive refrigerant in line 29 otherwise required in the primary distillation unit condenser 30 positioned at the top of the column treating the light fuel gas overhead stream 28. The vapors from a suitable upper tray in the column 26 are withdrawn through line 46 and cooled in the intercooler 44 by a suitable, e.g., −10° F., refrigerant, with the vapor and liquid exchanger effluent returning to the column via line 48. In such a manner the expensive refrigeration requirement is substantially shifted from the more expensive condenser unit 30 to the intercooler 44, thereby providing a substantial economic benefit. That is, the distillation column now employs a dual overhead "knockback" condenser, as well as a side stream refrigerated condenser which is adapted to operate to shift a very substantial amount, e.g., about 60 to 90%, usually about 75%, of the condensing load to conventional refrigeration at about −10° F., with only the remaining, e.g., 25% being at a substantially lower, e.g., −75° F., and more expensive temperature level.

The fuel gas distillate stream 28, which is typically 76-80 mole % hydrocarbon and at a temperature of −60° to −70° F., is preferably passed to a heavies column condenser unit 50 and utilized as a coolant in the condenser for the column overhead stream 52. After heating, the gas stream is depressurized to a desired pressure, e.g., a suitable delivery pressure to customers, such as 200 psig, and mixed with the cooled overhead from the heavies column 52, typically comprising mostly propane and butanes, thereby increasing the heating value of the resulting gas stream to a desired heating value, e.g., 800 BTU/SCF. Preferably, a substantial amount of the gas stream can be consumed within the process as fuel for the refrigeration and compressor gas engines.

The substantially liquid $CO_2$ sidedraw stream 32 after leaving the distillation unit and side stripper passes through line 54 to pump 56, preferably a $CO_2$ booster pump, in order to obtain an adequate NPSH for the following high pressure $CO_2$ pump 58. The pressurized $CO_2$ stream is then heated, preferably in feed product heat interchanger 18 by incoming feed stream 16, and the exiting $CO_2$ product stream typically leaves the process at about 800 to 3500 psig and about 30°–60° F. through line 20, where it is preferably mixed with fresh $CO_2$ before being reinjected into the petroleum-bearing subsurface, or utilized in another manner.

The bottoms stream 42 of the primary distillation unit 26 typically comprises a propane fraction along with lesser amounts of other heavier components present in the feed stream, together with a small amount of $CO_2$ and ethane. The stream is passed to a suitable separation unit, e.g., a small heavies distillation column 60, which, typically, is a small packed tower with an overhead condenser unit 50 cooled by the primary distillation unit overhead stream 28, and heated by a suitable reboiler unit 62. The small bottoms stream 64 from the column, typically comprising about 42 mole % hexane, 27% pentane, 22% isopentane and 8% butane, is preferably cooled and pressured back to a crude oil separator (not shown), while the lighter components are preferably taken overhead as a vapor distillate 52 and combined with the fuel gas stream 28 (as noted above) so as to increase the heating value of the exit gas to a desired content.

In the preferred embodiment of the invention, the liquid $CO_2$ sidedraw stream 32 is substantially stripped of its remaining small methane content by passing the stream through a suitable stripping zone, e.g., $CO_2$ stripping unit 34. The stripping enables the process to operate with a higher $CO_2$ purity, thereby greatly expanding the range of allowable $CO_2$ concentrations in feed gas streams. This is in contrast to prior art systems, particularly the one disclosed in U.S. Pat. No. 4,417,449, which are by necessity severely limited by their ability to process $CO_2$ streams containing a minimum of about 90% $CO_2$.

It is to be noted that, although the preferred embodiment of the invention has been set forth, various modifications can be made without deviating from the scope of the invention, such as the use of recycle streams and the like and, accordingly, the invention is not to be limited except as so defined in the appended claims.

We claim:

1. A process comprising, regenerating a $CO_2$ gaseous feed stream further containing a significant acid gas component having a $CO_2$ concentration of about 60–90 mole %, as well as a variety of carbonaceous compounds, including, compressing and cooling the $CO_2$ feed stream to a suitable elevated temperature and superatmospheric pressure;
substantially removing any acid gases present from the $CO_2$ feed stream;
drying the $CO_2$ feed stream;
separating the $CO_2$ feed stream in a single distillation zone, which is primarily externally refrigerated, into:

(a) a light fuel gas stream having a $CO_2$ concentration sufficiently high to proclude freezing in said distillation zone,
(b) a liquid, substantially $CO_2$-containing stream of a purity sufficient for use in tertiary oil recovery, and
(c) a heavy hydrocarbon stream;
cooling the light fuel gas stream;
pressurizing and transporting the substantially $CO_2$-containing liquid stream into a suitable heat exchange zone;
heating the $CO_2$-containing liquid stream to a suitable temperature to form a suitable product stream;
separating the heavy hydrocarbon stream into a lighter fuel gas stream and a heavier substantially $CO_2$-free hydrocarbon stream.

2. A process as claimed in claim 1 wherein the acid gas component comprises $H_2S$, COS, mercapatans, and various mixtures thereof.

3. A process as claimed in claim 1 wherein the carbonaceous compounds present in the $CO_2$ stream comprise a variety of petroleum-based compounds.

4. A process as claimed in claim 1 wherein the $CO_2$ feed stream is compressed and cooled to about 450 to 550 psig and 70° to 90° F.

5. A process as claimed in claim 1 wherein the compressed, cooled and acid gas component removed $CO_2$ feed is further cooled by contacting with a pressurized $CO_2$-containing liquid product stream in a suitable heat exchange zone.

6. A process as claimed in claim 1 wherein the $CO_2$ feed stream is dried to about 0 to 2 ppm water by an effective low temperature drying stage.

7. A process as claimed in claim 1 wherein the light fuel gas stream is substantially comprised of butane and lower hydrocarbons maintained at a temperature of about −60° to −70° F. and a pressure of about 400 to 600 psig.

8. A process as claimed in claim 1 wherein the substantially $CO_2$-containing stream is a liquid sidedraw stream comprising at least about 90 mole % $CO_2$ maintained at about 20°–30° F. and a pressure of about 400 to 600 psig.

9. A process as claimed in claim 1 wherein the heavy hydrocarbon stream substantially comprises the butanes and heavier hydrocarbons.

10. A process as claimed in claim 1 wherein the distillation zone is externally refrigerated by the utilization of a distillation intercooler unit positioned above the $CO_2$-containing sidedraw stream withdrawal.

11. A process as claimed in claim 10 wherein the refrigerant for the intercooler unit enters the unit at a temperature of about −10° F.

12. A process as claimed in claim 1 wherein the substantially $CO_2$-containing liquid stream is substantially stripped of non $CO_2$ component in an adjacent stripping zone.

13. A process as claimed in claim 1 wherein the light fuel gas stream is prepared for use as a suitable product stream.

14. A process as claimed in claim 1 wherein the $CO_2$ product stream is maintained at about 800–3500 psig and 30°–60° F.

15. A process as claimed in claim 1 wherein the heavy hydrocarbon stream is separated into a light fuel gas product stream and a heavier hydrocarbon product stream by a suitable distillation stage.

16. A process as claimed in claim 15 wherein the lighter gas product stream is combined with the light fuel gas stream from the primary distillation zone to form a fuel gas product stream.

17. A process as claimed in claim 1 wherein the $CO_2$-containing product stream is recycled to underground petroleum formations.

18. A process as claimed in claim 1 wherein the light fuel gas stream is cooled for use as a product by contacting in a suitably refrigerated overhead condenser unit and removing a desired light fuel gas fraction.

* * * * *